United States Patent
Visser et al.

(10) Patent No.: US 11,067,441 B2
(45) Date of Patent: Jul. 20, 2021

(54) CORRECTION OF CURVED PROJECTION OF A SPECTROMETER SLIT LINE

(71) Applicant: Nederlandse Organisatie voor toegepast-natuurwetenschappelijk onderzoek TNO, 's-Gravenhage (NL)

(72) Inventors: Huibert Visser, Rotterdam (NL); Hedser van Brug, The Hague (NL)

(73) Assignee: Nederlandse Organisatie voor toegepast-natuurwetenschappelijk onderzoek TNO, '-Gravenhage (NL)

( * ) Notice: Subject to any disclaimer, the term of this patent is extended or adjusted under 35 U.S.C. 154(b) by 0 days.

(21) Appl. No.: 16/480,207

(22) PCT Filed: Feb. 7, 2018

(86) PCT No.: PCT/NL2018/050084
§ 371 (c)(1),
(2) Date: Jul. 23, 2019

(87) PCT Pub. No.: WO2018/147731
PCT Pub. Date: Aug. 16, 2018

(65) Prior Publication Data
US 2019/0368926 A1    Dec. 5, 2019

(30) Foreign Application Priority Data

Feb. 8, 2017  (EP) .................................... 17155240
May 11, 2017  (EP) .................................... 17170616

(51) Int. Cl.
*G01J 3/02* (2006.01)
*G02B 17/08* (2006.01)

(52) U.S. Cl.
CPC .............. *G01J 3/024* (2013.01); *G01J 3/021* (2013.01); *G01J 3/0208* (2013.01); *G01J 3/0216* (2013.01); *G02B 17/0856* (2013.01)

(58) Field of Classification Search
CPC ........ G01J 3/0208; G01J 3/021; G01J 3/0216; G01J 3/024; G02B 17/0856; G02B 17/086; G02B 27/0025
(Continued)

(56) References Cited

U.S. PATENT DOCUMENTS 4,634,276 A    1/1987  Sharpe
4,681,438 A *  7/1987  Kaneko ................... G01C 5/02
                                              356/143
(Continued)

FOREIGN PATENT DOCUMENTS

CN    101634591 A    1/2010
CN    103175611 B    2/2015
(Continued)

OTHER PUBLICATIONS

European Patent Office, International Search Report in corresponding International Application No. PCT/NL2018/050084 dated Jun. 6, 2018 (2 pages).

*Primary Examiner* — Sunghee Y Gray
(74) *Attorney, Agent, or Firm* — Leydig, Voit & Mayer, Ltd.

(57) ABSTRACT

Correction optics (10) are disposed in an optical path directly behind an entry slit (1) of a spectrometer (100) and configured to warp a straight object line shape (A1) of the entry slit (1) into a curved object line shape (B1) from a point of view of the projection optics (2,3,4). The warping of the correction optics (10) is configured such that a curvature (R1) of the curved object line shape (B1) counteracts an otherwise distorting curvature (R5) in a projection (A5) of the straight object line shape (A1) by the projection optics (2,3,4) without the correction optics (10). As a result, the spectrally resolved image (B5) comprises a plurality of (Continued)

parallel straight projected line shapes formed by spectrally resolved projections of the straight object line shape (A1).

20 Claims, 5 Drawing Sheets

(58) Field of Classification Search
USPC .................................................. 356/326, 300
See application file for complete search history.

(56) References Cited

U.S. PATENT DOCUMENTS

| | | | | |
|---|---|---|---|---|
| 6,507,398 B1* | 1/2003 | Arai | .......................... | G01J 3/02 |
| | | | | 356/328 |
| 2010/0309454 A1* | 12/2010 | Zhang | ....................... | G01J 3/28 |
| | | | | 356/39 |
| 2013/0278763 A1* | 10/2013 | Royo Royo | ........... | G02B 23/06 |
| | | | | 348/143 |

FOREIGN PATENT DOCUMENTS

| | | |
|---|---|---|
| CN | 104330158 A | 2/2015 |
| EP | 1387154 A1 | 2/2004 |
| WO | WO 90/02928 A1 | 3/1990 |
| WO | WO 2009/070459 A1 | 6/2009 |
| WO | WO 2015/093944 A1 | 6/2015 |

\* cited by examiner

CORRECTION OF CURVED PROJECTION OF A SPECTROMETER SLIT LINE

CROSS-REFERENCE TO RELATED APPLICATIONS

This patent application is a U.S. National Phase of PCT International Application No. PCT/NL2018/050084, filed Feb. 7, 2018, which claims priority to European Application No. 17170616.1, filed May 11, 2017, and European Application No. 17155240.9, filed Feb. 8, 2017, which are both expressly incorporated by reference in their entireties, including any references contained therein.

TECHNICAL FIELD AND BACKGROUND

The present disclosure relates to spectrometers, correction optics, and methods for correcting curvature in the projection of a straight entry slit onto a detector array.

For example, U.S. Pat. No. 4,634,276 discloses configurations of optical systems using two concave mirrors to image an off-axis slit that are used in monochromators or spectrographs in which the coma produced by one mirror is cancelled by that produced by the other mirror. Such systems produce a curved line image of a straight line slit. According to the prior art, this curvature is substantially removed in a two concave mirror optical system in which the off-axis angle and the separation between the mirrors are chosen so that the principal ray from the center of the line object to the first mirror and the principal ray I from the second mirror to the center of the line image are both substantially perpendicular to an axis of symmetry of the optical system which passes through the centers of curvature of the two concave mirrors. The image line is then curved in a plane normal to the image plane and appears substantially straight in the image plane.

It is desired to provide simple correction optics that can be easily inserted into existing spectrometers to variably correct undesired curvature in the projection of a straight entry slit.

SUMMARY

Various aspects of the present disclosure thus provide an improved spectrometer. The spectrometer typically comprises an entry slit configured to receive a one-dimensional image slice of light for spectral analysis along a straight object line shape. Projection optics are configured to project a spectrally resolved two-dimensional image of the straight object line shape onto a detector array. Correction optics as described herein can be disposed in an optical path directly behind the entry slit and configured to warp the straight object line shape of the entry slit into a curved object line shape from a point of view of the projection optics. The warping of the correction optics is configured such that a curvature of the curved object line shape counteracts an otherwise distorting curvature in a projection of the straight object line shape by the projection optics without the correction optics. Accordingly, the spectrally resolved image comprises a plurality of parallel straight projected line shapes formed by spectrally resolved projections of the straight object line shape.

Some aspects of the present disclosure may be advantageously embodied as a monolithic block of material forming correction optics for correcting curvature in the projecting of a straight entry slit on a detector array in a spectrometer. For example the correction optics may comprise one or more of an internal reflection surface forming a cylindrical mirror plane with its curvature around a first cylinder axis; a curved entry surface forming a collimation compensator configured to counteract decollimation of parallel principal light rays after reflection by the cylindrical mirror plane, wherein the collimation compensator comprises a cylindrical optical surface with its curvature around a second cylinder axis at an angle with respect to the first cylinder axis; a flat mirror plane extending in a direction parallel to the first cylinder axis; and an exit surface parallel to the second cylinder axis.

Other or further aspects of the present disclosure may be embodied as methods for correcting curvature in the projection of a spectrally resolved image of an entry slit by spectrometer onto a detector array. For example, the method comprises providing correction optics, as described herein, in an optical path directly behind the entry slit and configuring the correction optics to warp a straight object line shape of the entry slit into a curved object line shape from a point of view of projection optics in the spectrometer between the correction optics and the detector array, wherein the warping of the correction optics is configured such that a curvature of the curved object line shape counteracts an otherwise distorting curvature in the projection of the straight object line shape by the projection optics without the correction optics, wherein the spectrally resolved image comprises a plurality of parallel straight projected line shapes formed by spectrally resolved projections of the straight object line shape.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
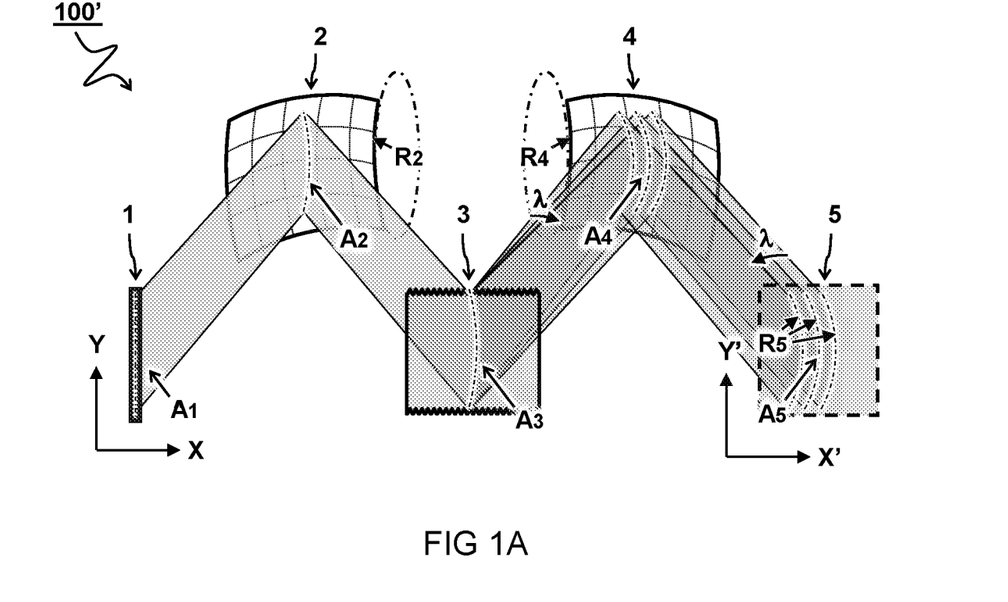
FIGS. 1A and 1B schematically illustrate a spectrometer without and with correction optics, respectively.

FIG. 1A schematically illustrates a spectrometer 100' with projection optics 2,3,4 affected by undesired curvature R5 in the projected image A5 on the detector array 5.

Typically, projection optics in a spectrometer comprise curved optical surfaces such as mirrors and lenses to shape the projected image. The projection optics typically also comprise spectral resolving means such as a grating or prism for redirecting parts of the projected image depending on a wavelength "λ" of the light. In some embodiments, the projection optics comprise collimation optics 2 configured to collimate light rays originating from the entry slit 1 as a collimated beam onto the spectral resolving element 3. For example, the collimation optics 2 comprise parabolic mirror with its focal point coinciding with the entry slit 1. In some embodiments, the projection optics comprise focusing or imaging optics 4 configured focus the collimated beam onto the detector array 5, i.e. image the entry slit 1. For example, focusing or imaging optics 4 comprise a parabolic mirror configured to focus a collimated beam reflected from the grating 3 to a point or line onto an imaging plane coinciding with pixels of the detector array 5.

In the example shown, the projected image A5 comprises a plurality of spectrally resolved (curved line) images of the straight object line shape A1 at the entry slit 1. For example, the detector array 5 may be a two dimensional pixel array wherein light of the entry slit 1 is resolved both as a function of wavelength λ along a first direction X' of the detector array 5 and along a perpendicular second direction Y' corresponding to a length direction Y of the straight object line shape A1 formed by an aperture of the entry slit 1. For example distorting curvature may be caused by projection optics 2,4 having respective curvatures R2,R4 not only around the Y axis but also around the X axis (transverse to the slit). When a parallel light beams of the straight entry slit 1 are projected at an angle onto the curved mirror 2, the reflection for different beams may occur at different positions (X) transverse to the length of the slit. While the present example show curved mirrors, similar distortions may also occur in other optics, e.g. lenses.

Unfortunately, due to the distorting curvature R5 of the projected line shapes, reconstruction of the image and its spectral components may be difficult, e.g. additional software correction may be needed. Furthermore, effective use of the (rectangular) detector array 5 may be diminished.

Figure 1B:
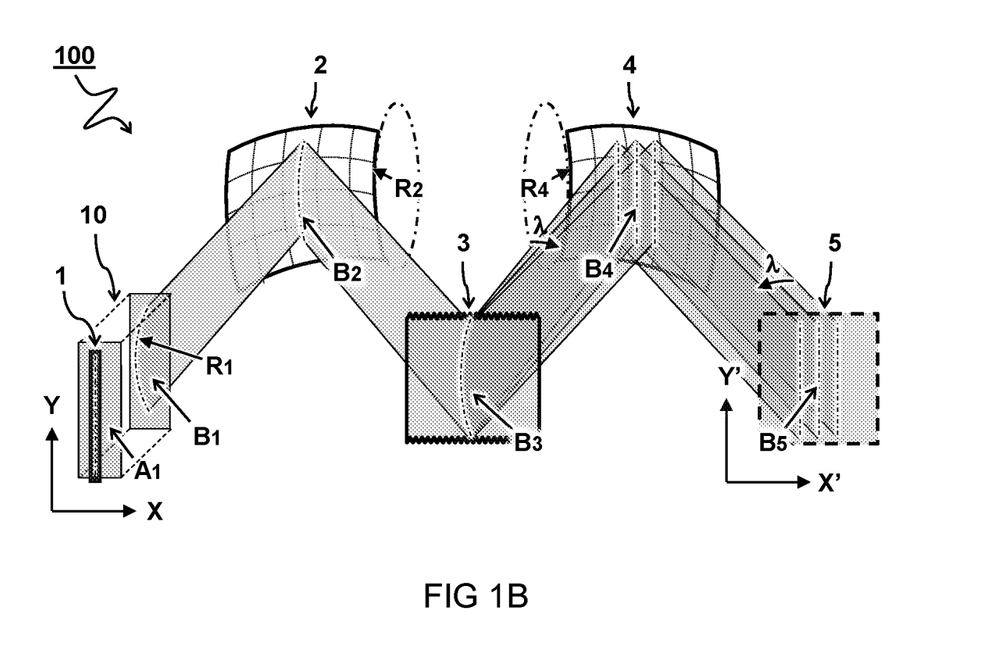

FIG. 1B schematically illustrates an improved spectrometer 100' with correction optics 10 disposed in an optical path directly behind the entry slit 1 and configured to warp the straight object line shape A1 of the entry slit 1 into a curved object line shape B1 from a point of view of the projection optics 2,3,4 and/or detector array 5. In the embodiment shown, the warping of the correction optics 10 is configured such that a curvature R1 of the curved object line shape B1 fully, or at least partially, counteracts an otherwise distorting curvature R5 in a projection A5 of the straight object line shape A1 by the projection optics 2,3,4 without the correction optics 10, as was shown in FIG. 1A. In other words, the curvature R5 of the uncorrected image A5 shown in FIG. 1A is gone in the corrected image B5, or at least diminished (larger or infinite radius of curvature). Accordingly, the spectrally resolved image B5 comprises a plurality of parallel straight projected line shapes formed by spectrally resolved projections of the straight object line shape A1. In some embodiments, the spectrometer 100 is used to scan an object line by line e.g. by projecting image slices of the object onto the entry slit 1 using additional optics outside the spectrometer 100 (not shown)

Figure 2A:
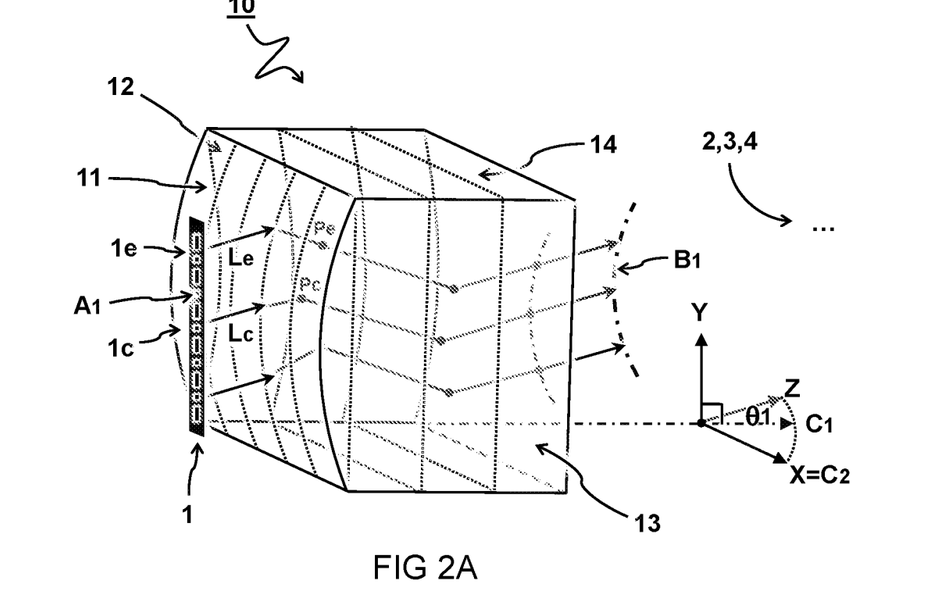
FIGS. 2A-2D schematically illustrate various views of one embodiment for the correction optics.
Figure 2B:
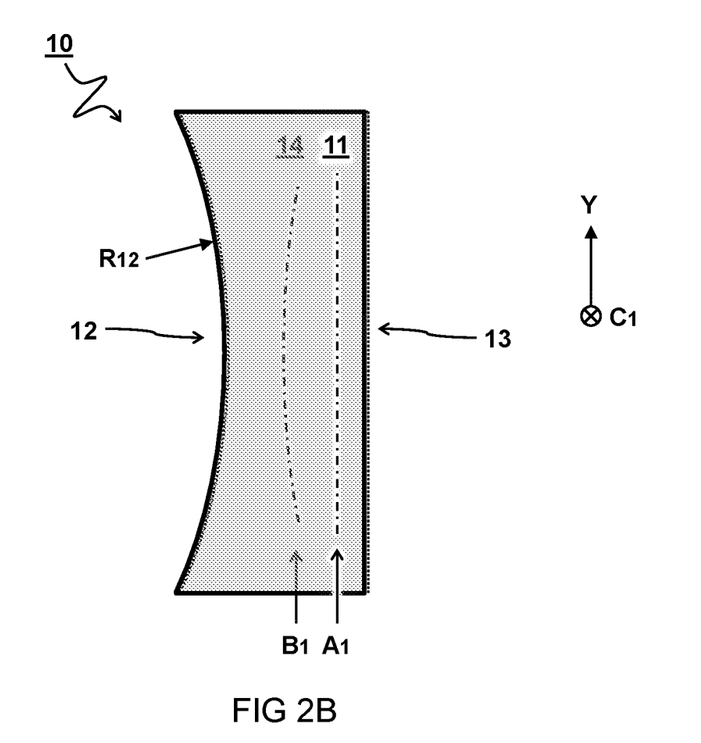
Figure 2C:
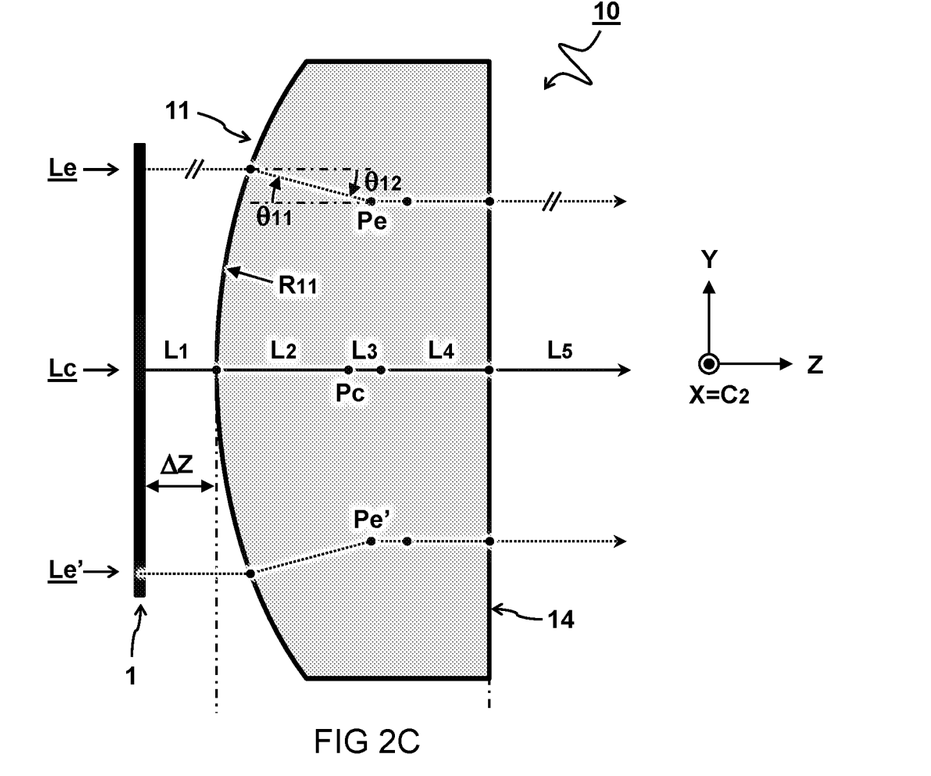
Figure 2D:
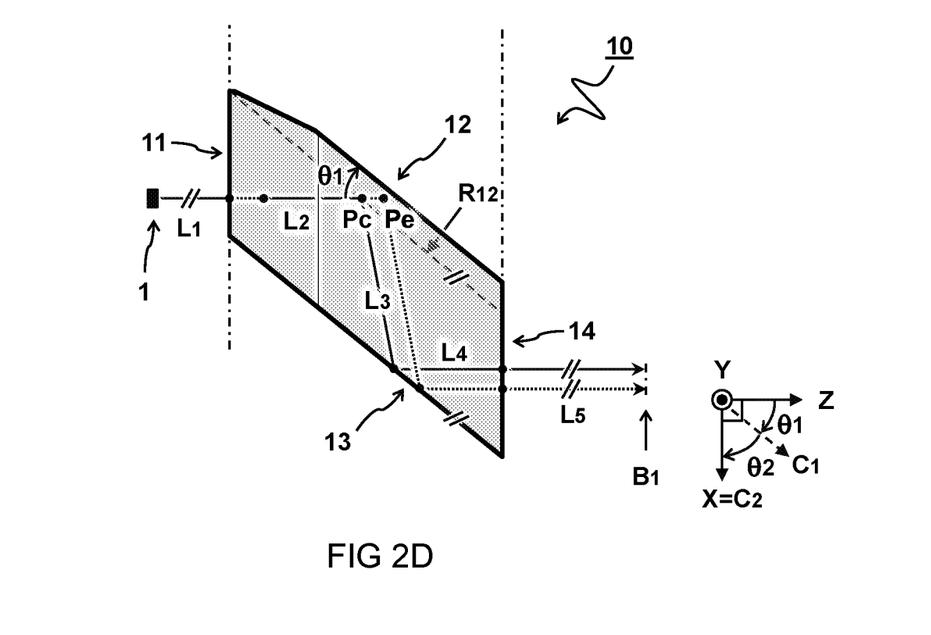

FIGS. 2A-2D schematically show an illustrative embodiment for the correction optics 10 as described herein. In the illustrative figures, some curvatures may be exaggerated to demonstrate desired effects. FIG. 2A schematically illustrates a perspective view of the embodiment. FIG. 2B schematically illustrates a front view of the embodiment along a first cylindrical axis C1 of a side surface 12. FIG. 2C schematically illustrates a side view of the embodiment along a second cylinder axis C2 of a front surface (coinciding with the X axis). FIG. 2D schematically illustrates a top view of the embodiment along a slit direction Y, i.e. along a length of the entry slit 1.

In one embodiment, e.g. as illustrated in FIGS. 2A and 2B, the correction optics 10 comprise a cylindrical mirror plane 12 with its curvature R12 around a first cylinder axis C1 in a direction perpendicular to a length Y of the entry slit 1. The cylindrical mirror plane as described herein refers to a mirror surface having a curvature in one direction while following a straight line in another, perpendicular direction. The curvature may be circular, elliptical, parabolic, or other curved shapes generally following a constant or variable curvature in one direction. The cylinder axis as described herein refers to an imaginary axis parallel to the straight lines of the cylindrical mirror plane. For a circular cylinder, this may e.g. be the centerline of the cylinder or any line parallel there to.

In one embodiment, e.g. as illustrated in FIGS. 2A and 2D, the first cylinder axis C1 is at a first cylinder angle θ1 with respect a direction Z of principal light rays Le,Lc originating from the entry slit 1. The principal light rays may e.g. represent light following a characteristic or shortest optical path through the optics. In the embodiment shown, the principal light rays are a collection of initially parallel light rays originating from the entry slit 1 traveling in a direction Z that is perpendicular to a length of the slit (Y). In the embodiment shown, the principal rays Lc,Le are also perpendicular to the second cylinder axis C2 of the front surface 11, which in this case coincides with the X axis.

In some embodiments, e.g. as illustrated in FIGS. 2A and 2D, the first cylinder axis C determines a degree of curvature of the curved object line shape B1 compared to the straight object line shape A1. This can be understood as follows. In the embodiment shown, parallel principal light rays Lc,Le originating from different coordinates Y along the entry slit 1 intersect with the cylindrical mirror plane 12 at intersection points Pc,Pe having different coordinates along the first cylinder axis C1. Accordingly, a principal first light ray Lc originating from a center 1c of the entry slit 1 travels another distance to a point of intersection Pc with the cylindrical mirror plane 12 compared to a principal second light ray Le, parallel to the principal first light ray, but originating from an edge 1e of the entry slit 1 and intersecting at point Pe. In this way, the straight object line shape A1 may be reflected as a curved line shape by reflection off the cylindrical mirror plane 12. In a preferred embodiment, as shown, the cylindrical mirror plane 12 is convex from a point of view of the reflecting light rays Le,Lc. In such embodiment, a shortest optical path from a center 1c of the entry slit 1 to the convex cylindrical mirror plane 12 is shorter than a shortest optical path from an edge 1e of the entry slit 1 to the convex cylindrical mirror plane 12. Alternatively, the cylindrical mirror plane 12 may be concave from a point of view of the light rays reflecting inside the monolithic block which may provide a curvature in the other direction.

In one embodiment, e.g. as illustrated in FIGS. 2A and 2C, the correction optics 10 comprise a collimation compensator 11 configured to counteract decollimation of parallel principal light rays Lc,Le originating from the entry slit 1 after reflection by the cylindrical mirror plane 12. In another or further embodiment, the collimation compensator 11 is configured to bend principal light rays Lc,Le over a compensation angle θ11 equal but opposite to a decollimation angle θ12 at least in a second projection plane YZ perpendicular to the second cylinder axis C2 (shown in FIG. 2C). In a preferred embodiment, reflected light rays L3 after traversing the collimation compensator 11 and cylindrical mirror plane 12 are parallel to originating light rays L1 before traversing the collimation compensator 11 and cylindrical mirror plane 12 at least in the second projection plane YZ (shown in FIG. 2C).

In one embodiment, the collimation compensator 11 comprises a cylindrical optical surface with its curvature R11 around a second cylinder axis C2 in a direction X perpendicular to a length Y of the entry slit 1. In the embodiment illustrated by FIG. 2C, the collimation compensator 11 comprises a cylindrical lens or mirror having the opposite collimation effect as the cylindrical mirror plane 12 at least in the plane Y,Z spanned by the principal light rays Le,Lc and/or equivalent mirror planes. For example, in the embodiment shown, the collimation compensator 11 converges the light rays which are subsequently diverged after reflection by the convex cylindrical mirror plane 12. Alternatively, the light rays may be diverged by the collimation compensator to compensate for converging reflection from a concave cylindrical mirror plane (not shown).

As shown in the perpendicular view of FIG. 2D, the second cylinder axis C2 is at a second cylinder angle θ2 with respect to the first cylinder axis C1. Preferably, the second cylinder axis C2 has a direction X perpendicular to a direction Z of the parallel principal light rays Lc,Le originating from the entry slit 1. In preferred embodiments, the collimation compensator 11 is configured to converge principal light rays Lc,Le originating from different parts 1c, 1e of the entry slit 1 to compensate a diverging effect of the light rays reflecting off a convex cylindrical mirror plane 12. Alternatively, the collimation compensator may be configured to diverge parallel principal light rays to compensate a converging effect of a concave cylindrical mirror (not shown).

In the embodiment shown, the collimation compensator 11 is disposed in a light path between the entry slit 1 and the cylindrical mirror plane 12. Alternatively, though not preferably, the collimation compensator may be disposed in a light path after the cylindrical mirror plane 12 (not shown). Converging the beams before hitting a diverging surface may be more efficient.

In one embodiment, e.g. as illustrated in FIGS. 2A and 2D, the correction optics 10 comprise a flat mirror plane 13 extending in a direction parallel to the first cylinder axis C1 (indicated in the figures by two parallel lines//). In another or further embodiment, the flat mirror plane 13 is configured to reflect light rays L4 in a principal direction Z parallel to original light rays L before the cylindrical mirror plane 12 at least in a projection plane XZ perpendicular to a length direction Y of the entry slit 1. In a preferred embodiment, parallel principal light rays L1 originating from the entry slit 1 remain parallel//to the resulting light rays L5 after traversing the correction optics 10 (both in the YZ plane, as shown in FIG. 2C, and the XZ plane, as shown in FIG. 2D). It will be appreciated, as illustrated in FIG. 2D, that, compared to the originating principal rays L1, the resulting parallel principal rays L5 after traversing the correction optics 10 are relatively displaced in direction X transverse to a length Y of the slit as a function of their position along the slit to form the curved object line shape B1.

In the embodiment shown, the correction optics 10 are formed by a monolithic block of material. This has advantages of robustness, compactness and easy alignment which has especially advantages in the present applications. Preferably, the collimation compensator 11 is formed by a cylindrically curved entry surface of the monolithic block. For example, the collimation compensator 11 comprises a positive lens surface from a point of view of the light rays L1 impinging the monolithic block from the front side. In some embodiments, the cylindrical mirror plane 12 is formed by an internal reflection surface of the monolithic block. For example, the cylindrical mirror plane 12 is a concave surface from a point of view outside the monolithic block, or a convex surface from a point of view of the light rays reflecting inside the monolithic block. In an alternative embodiment (not shown), the cylindrical mirror plane can be concave from a point of view of the reflecting light rays and the collimation compensator adjusted accordingly, e.g. providing a negative lens surface for diverging the principal light rays compensating for the converging after reflection from the cylindrical mirror plane.

In some embodiments, the flat mirror plane 13 comprises a flat surface of the monolithic block opposite the cylindrical mirror plane 12. The monolithic block as shown comprises an exit surface 14. Preferably, the exit surface 14 is perpendicular to outgoing principal light rays L4. In an alternative embodiment (not shown), the exit surface may form a collimation compensator instead of, or in addition to the entry surface. So decollimation caused by reflection off the cylindrical mirror plane may be compensated can be before and/or after the reflection.

In the embodiment shown, the exit surface 14 is parallel to the second cylinder axis C2 of the front surface forming the collimation compensator 11. In some embodiments, the monolithic block is shaped as a parallelogram on a projected plane XZ perpendicular to a direction Y of the entry slit 1. For example, the second cylinder axis C2 of the curved entry surface forming the collimation compensator 11 and the exit surface 14 are at a non perpendicular angle θ2 with respect to the first cylinder axis C1 of the cylindrical mirror plane 12 and the flat mirror plane 13. Preferably, the monolithic block is a relatively flat slab of material with some of its surface curved. For example, the opposing cylindrical mirror plane 12 and flat mirror plane 13 are relatively close together compared to the opposing entry surface 11 and exit surface 14.

Some aspects of the present disclosure may thus be embodied as a monolithic block of material forming correction optics 10 for correcting curvature in the projecting of a straight entry slit 1 on a detector array 5 in a spectrometer 100. Preferably, the correction optics 10 comprise one or more of an internal reflection surface forming a cylindrical mirror plane 12 with its curvature R12 around a first cylinder axis C1; a curved entry surface forming a collimation compensator 11 configured to counteract decollimation of parallel principal light rays Lc,Le after reflection by the cylindrical mirror plane 12 (telecentric), wherein the collimation compensator 11 comprises a cylindrical optical surface with its curvature R11 around a second cylinder axis C2 at an angle θ2 with respect to the first cylinder axis C1; a flat mirror plane 13 extending in a direction parallel//to the first cylinder axis C1; and an exit surface 14 parallel to the second cylinder axis C2.

Other or further aspects of the present disclosure may be embodied as a method for correcting curvature in the projection of a spectrally resolved image of an entry slit 1 by spectrometer 100 onto a detector array 5. For example, the method comprising providing correction optics 10 in an optical path directly behind the entry slit 1 and configuring the correction optics 10 to warp a straight object line shape A1 of the entry slit 1 into a curved object line shape B1 from a point of view of projection optics 2,3,4 in the spectrometer 100 between the correction optics 10 and the detector array 5. Preferably, the warping of the correction optics 10 is configured such that a curvature R1 of the curved object line shape B1 counteracts an otherwise distorting curvature R5 in the projection A5 of the straight object line shape A1 by the projection optics 2,3,4 without the correction optics 10. Accordingly the spectrally resolved image B5 comprises a plurality of parallel straight projected line shapes formed by spectrally resolved projections of the straight object line shape A1.

In a preferred embodiment, e.g. as illustrated in FIG. 2C, the correction optics 10 is positioned within a distance ΔZ less than one centimeter from the entry slit 1, preferably less than five millimeter, e.g. between one and three millimeter. For example, the entry surface 11 of the monolithic block forming the correction optics 10 is less within this distance ΔZ from the entry slit 1. Bringing the correction optics 10 closer to the entry slit, may allow it to act within the (near) field of the slit e.g. acting as a field correction lens. The correction optics 10 itself may be relatively small, e.g. extending less than fifty millimeters in its longest dimension, less than thirty millimeters or even less, e.g. between five and thirty millimeters. Typically a size of the correction optics 10 is adjusted to a size of the entry slit 1, e.g. have a size between one and two times a length of the entry slit, e.g. a factor between 1.1-1.5 times the length of the slit.

Figure 3A:
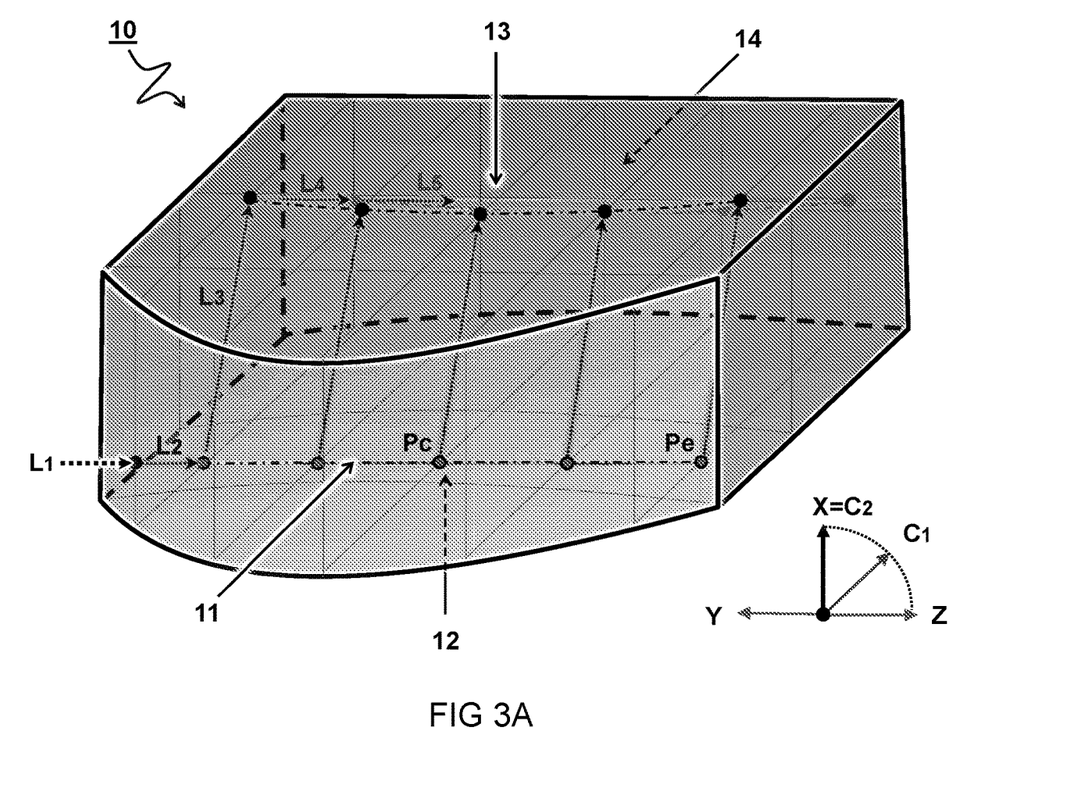
FIGS. 3A-3C illustrate various views of another embodiment for the correction optics based on computer aided design.
Figure 3B:
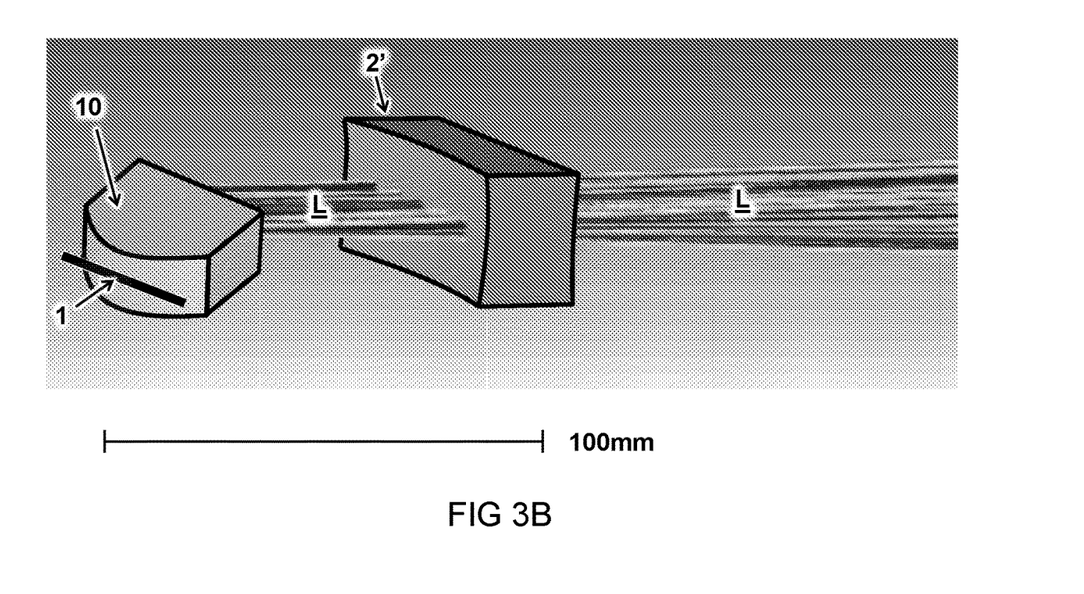
Figure 3C:
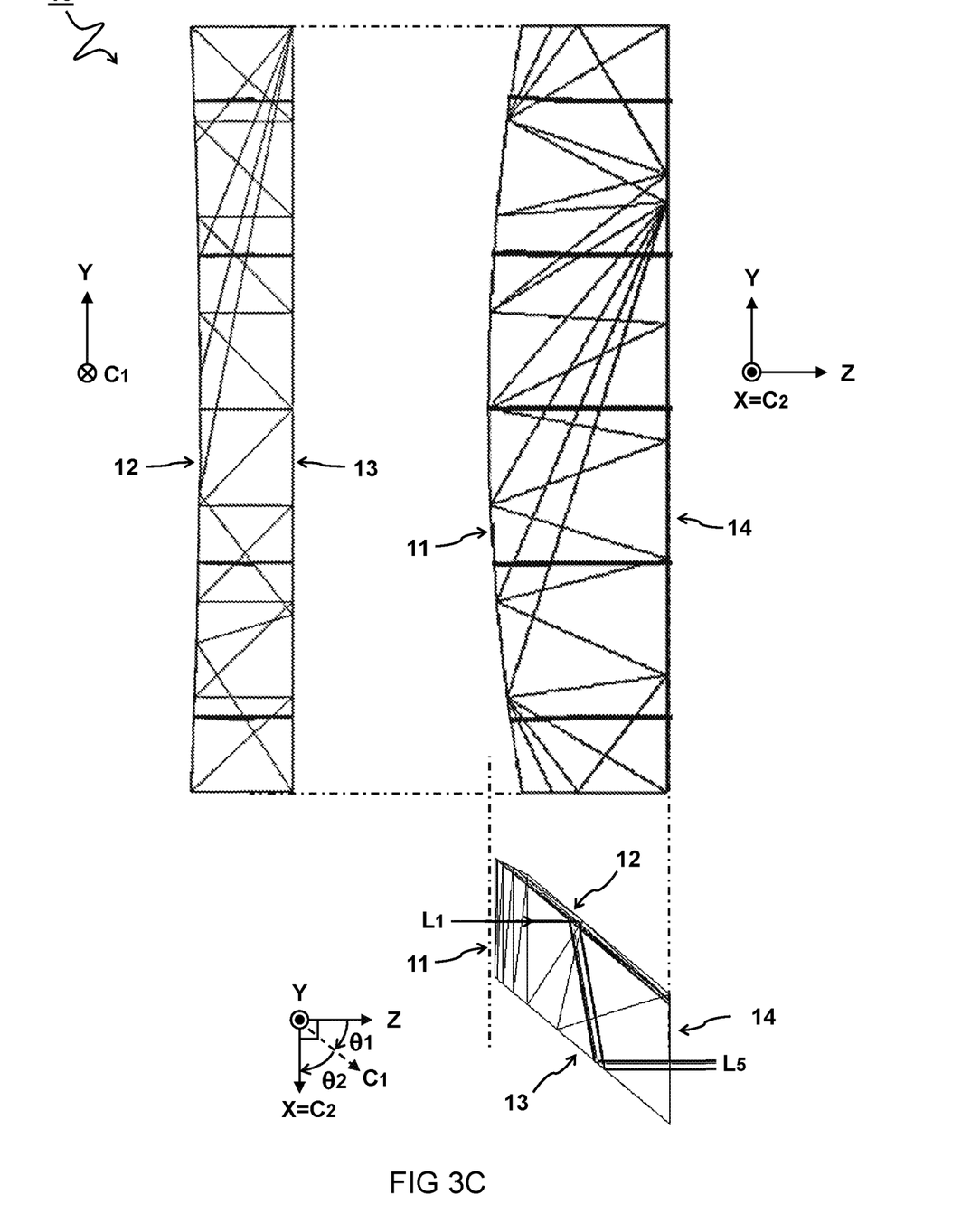

FIGS. 3A-C illustrate an embodiment for the correction optics based computer aided design (CAD). FIG. 3A illustrates a perspective view of the embodiment with added lines to emphasize the shape of the monolithic block and light rays L1-L5 including points of reflection Pc,Pe at the cylindrical mirror plane 12. FIG. 3B illustrate the positioning of the correction optics 10 with respect to the entry slit 1 and first projection optics 2' of the spectrometer (not completely shown). Also shown are model calculations of light rays L in various directions and wavelengths traversing the spectrometer. FIG. 3C shows various view of the embodiment in different directions of as indicated. These views correspond to the illustrative views of the embodiment described with reference to FIGS. 2B,2C,2D.

For the purpose of clarity and a concise description, features are described herein as part of the same or separate embodiments, however, it will be appreciated that the scope of the invention may include embodiments having combinations of all or some of the features described. For example, while embodiments were shown for a monolithic block of material, also alternative ways may be envisaged by those skilled in the art having the benefit of the present disclosure for achieving a similar function and result. E.g. optical planes or components may be combined or split up into one or more alternative planes. The various elements of the embodiments as discussed and shown offer certain advantages, such as correcting undesired curvature in the projection of a slit in a spectrometer. Of course, it is to be appreciated that any one of the above embodiments or processes may be combined with one or more other embodiments or processes to provide even further improvements in finding and matching designs and advantages. It is appreciated that this disclosure offers particular advantages to spectrometers with two dimensional array sensor, and in general can be applied for any application wherein undesired warping in projection of a straight line needs correcting.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A spectrometer comprising:
   an entry slit configured to receive a one-dimensional image slice of light for spectral analysis along a straight object line shape;
   a projection optics configured to project a spectrally resolved two-dimensional image of the straight object line shape onto a detector array; and
   a correction optics disposed in an optical path directly behind the entry slit to receive a parallel principal light rays originating from the entry slit, the correction optics comprising:
      a cylindrical mirror surface having a curvature around a first cylinder axis in a direction perpendicular to a length of the entry slit for providing a first reflection of the light originating from the entry slit;
      a collimation compensator configured to counteract a decollimation of parallel principal light rays of the parallel principal light rays caused by the first reflection; and
      a flat mirror surface extending in a direction parallel to the first cylinder axis for providing a second reflection of the light,
   wherein the correction optics is configured to provide a warping of a straight object line shape of the entry slit into a curved object line shape from a point of view of the projection optics,
   wherein the warping provided by the correction optics is configured such that a curvature of the curved object line shape counteracts an otherwise distorting curvature in a projection of the straight object line shape by the projection optics without the correction optics, and
   wherein the spectrally resolved two-dimensional image comprises a plurality of parallel straight projected line shapes formed by spectrally resolved projections of the straight object line shape.

2. The spectrometer according to claim 1, wherein the correction optics comprises a monolithic block of material with a set of distinct surfaces, with each one of the set of distinct surfaces forming one of:
    the cylindrical mirror surface,
    the collimation compensator, and
    the flat mirror surface.

3. The spectrometer according to claim 2, wherein the monolithic block comprises an exit surface, and wherein the exit surface is parallel to a second cylinder axis of a front surface forming the collimation compensator.

4. The spectrometer according to claim 1, wherein the collimation compensator is configured to re-collimate principal light rays originating from different parts of the entry slit to compensate for the decollimation caused by the light rays reflecting off the cylindrical mirror surface.

5. The spectrometer according to claim 4, wherein the parallel principal light rays originating from different coordinates along the entry slit intersect with the cylindrical mirror surface at intersection points having different coordinates along the first cylinder axis,
    wherein a principal first light ray, of the parallel principal light rays, originating from a center of the entry slit travels another distance to a point of intersection with the cylindrical mirror surface compared to a principal second light ray, of the parallel principal light rays, parallel to the principal first light ray, but originating from an edge of the entry slit, and
    wherein the straight object line shape is reflected as a curved line shape by reflection off the cylindrical mirror surface.

6. The spectrometer according to claim 1, wherein the cylindrical mirror surface is convex from a point of view of the parallel principal light rays reflected by the cylindrical mirror surface.

7. The spectrometer according to claim 1, wherein the collimation compensator is disposed in a light path between the entry slit and the cylindrical mirror surface.

8. The spectrometer according to claim 1, wherein the parallel principal light rays originating from the entry slit remain parallel to the resulting light rays after traversing the correction optics.

9. The spectrometer according to claim 1, wherein the parallel principal light rays after traversing the correction optics are relatively displaced in direction transverse to a length of the slit as a function of their position along the slit to form a curved object line shape.

10. The spectrometer according to claim 1, wherein the correction optics is positioned within a distance less than one centimeter from the entry slit.

11. A method for correcting curvature in a projection of a spectrally resolved image of an entry slit by spectrometer onto a detector array, the method comprising:
    providing a correction optics in an optical path directly behind the entry slit wherein the correction optics comprise:
        an internal reflection surface forming a cylindrical mirror surface having a curvature around a first cylinder axis;
        a curved entry surface forming a collimation compensator configured to counteract a decollimation of parallel principal light rays after reflection by the cylindrical mirror surface, wherein the collimation compensator comprises a cylindrical optical surface with its curvature around a second cylinder axis at an angle with respect to the first cylinder axis;
        a flat mirror surface extending in a direction parallel to the first cylinder axis; and
        an exit surface parallel to the second cylinder axis; and
    configuring the correction optics to warp a straight object line shape of the entry slit into a curved object line shape from a point of view of projection optics in the spectrometer between the correction optics and the detector array,
    wherein the warping of the correction optics is configured such that a curvature of the curved object line shape counteracts an otherwise distorting curvature in the projection of the straight object line shape by the projection optics without the correction optics, and
    wherein the spectrally resolved two-dimensional image comprises a plurality of parallel straight projected line shapes formed by spectrally resolved projections of the straight object line shape.

12. A spectrometer comprising:
    an entry slit configured to receive a one-dimensional image slice of light for spectral analysis along a straight object line shape;
    a projection optics configured to project a spectrally resolved two-dimensional image of the straight object line shape onto a detector array; and
    a correction optics disposed in an optical path directly behind the entry slit to receive a parallel principal light rays originating from the entry slit, the correction optics comprising:
        a cylindrical mirror surface having a curvature around a first cylinder axis in a direction perpendicular to a length of the entry slit for providing a first reflection of the light originating from the entry slit;
        a collimation compensator configured to counteract a decollimation of parallel principal light rays of the parallel principal light rays caused by the first reflection; and
        a flat mirror surface extending in a direction parallel to the first cylinder axis for providing a second reflection of the light,
    wherein the collimation compensator is configured to re-collimate principal light rays originating from different parts of the entry slit to compensate for the decollimation caused by the light rays reflecting off the cylindrical mirror surface.

13. The spectrometer according to claim 12, wherein the parallel principal light rays originating from different coordinates along the entry slit intersect with the cylindrical mirror surface at intersection points having different coordinates along the first cylinder axis,
    wherein a principal first light ray, of the parallel principal light rays, originating from a center of the entry slit travels another distance to a point of intersection with the cylindrical mirror surface compared to a principal second light ray, of the parallel principal light rays, parallel to the principal first light ray, but originating from an edge of the entry slit, and
    wherein the straight object line shape is reflected as a curved line shape by reflection off the cylindrical mirror surface.

14. The spectrometer according to claim 12, wherein the correction optics comprises a monolithic block of material with a set of distinct surfaces, with each one of the set of distinct surfaces forming one of:
    the cylindrical mirror surface,
    the collimation compensator, and
    the flat mirror surface.

15. The spectrometer according to claim 14, wherein the monolithic block comprises an exit surface, and wherein the exit surface is parallel to a second cylinder axis of a front surface forming the collimation compensator.

16. The spectrometer according to claim 12, wherein the cylindrical mirror surface is convex from a point of view of the parallel principal light rays reflected by the cylindrical mirror surface.

17. The spectrometer according to claim 12, wherein the collimation compensator is disposed in a light path between the entry slit and the cylindrical mirror surface.

18. The spectrometer according to claim 12, wherein the parallel principal light rays originating from the entry slit remain parallel to the resulting light rays after traversing the correction optics.

19. The spectrometer according to claim 12, wherein the parallel principal light rays after traversing the correction optics are relatively displaced in direction transverse to a length of the slit as a function of their position along the slit to form a curved object line shape.

20. The spectrometer according to claim 12, wherein the correction optics is positioned within a distance less than one centimeter from the entry slit.

\* \* \* \* \*